(12) United States Patent
Bachelder et al.

(10) Patent No.: US 6,742,324 B2
(45) Date of Patent: Jun. 1, 2004

(54) METHODS AND APPARATUS FOR SUPPORTING VARIABLE BYPASS VALVE SYSTEMS

(75) Inventors: Kenneth Alan Bachelder, Milford, OH (US); Donald James Welty, Milford, OH (US)

(73) Assignee: General Electric Company, Schenectady, NY (US)

( * ) Notice: Subject to any disclaimer, the term of this patent is extended or adjusted under 35 U.S.C. 154(b) by 42 days.

(21) Appl. No.: 10/243,232

(22) Filed: Sep. 13, 2002

(65) Prior Publication Data

US 2004/0050071 A1 Mar. 18, 2004

(51) Int. Cl.7 .............................. F02K 3/06; F02K 3/075
(52) U.S. Cl. ........................ 60/204; 60/226.3; 60/785; 415/145
(58) Field of Search ............................ 60/226.3, 785, 60/204; 415/145

(56) References Cited

U.S. PATENT DOCUMENTS

| | | | | |
|---|---|---|---|---|
| 3,638,428 A | * | 2/1972 | Shipley et al. .............. 415/145 |
| 3,898,799 A | * | 8/1975 | Pollert et al. ................ 415/145 |
| 4,292,802 A | * | 10/1981 | Snow ........................... 60/204 |
| 4,409,788 A | * | 10/1983 | Nash et al. ................. 60/226.3 |
| 4,817,378 A | * | 4/1989 | Giffin et al. .................. 60/762 |
| 5,123,240 A | | 6/1992 | Frost et al. |
| 5,136,840 A | * | 8/1992 | Nash ......................... 60/226.3 |
| 5,269,135 A | | 12/1993 | Vermejan et al. |
| 5,794,432 A | | 8/1998 | Dunbar et al. |
| 6,292,763 B1 | | 9/2001 | Dunbar et al. |
| 6,402,487 B1 | | 6/2002 | Clements et al. |

* cited by examiner

*Primary Examiner*—Ted Kim
(74) *Attorney, Agent, or Firm*—Nathan D. Herkamp; Armstrong Teasdale LLP; Robert B. Reeser, III

(57) ABSTRACT

A method enables a gas turbine engine variable bypass valve system to be assembled. The method comprises positioning a unison ring circumferentially within the gas turbine engine such that the unison ring is radially outward from a structural frame, coupling at least one bellcrank to the unison ring, such that the unison ring is radially supported only by said at least one bellcrank, and coupling the at least one bellcrank to a bellcrank support that is coupled to the structural frame.

20 Claims, 3 Drawing Sheets

METHODS AND APPARATUS FOR SUPPORTING VARIABLE BYPASS VALVE SYSTEMS

BACKGROUND OF THE INVENTION

This application relates generally to gas turbine engines and, more particularly, to variable bypass valve systems used with gas turbine engines.

At least some known gas turbine engines include a fan upstream from a core engine that includes, in serial flow relationship, a low pressure compressor, or a booster, and a high pressure compressor. The low pressure compressor and the high pressure compressor compress airflow entering the combustor through the fan, with the airflow moving through an inlet section and a discharge section of the booster and then through an inlet section and a discharge section of the high pressure compressor. The booster is designed to facilitate providing optimal airflow to the high pressure compressor above a specific design throttle setting. At throttle settings off design, the booster may supply more air than the high pressure compressor can flow, which can lead to unsteady airflow in the engine.

To facilitate mitigating the effects of unsteady airflow, at least some known gas turbine engines include variable bleed valve (VBV) systems which rotate bypass doors open during unsteady airflow conditions to allow booster airflow to exit and bypass the high pressure compressor. The bleed doors and valves facilitate protecting the booster and high pressure compressor from eventual aerodynamic stall. At least some known VBV systems include a unison ring that is supported by dedicated ring supports extending from the booster frame structure. The structural supports facilitate preventing the unison ring from deforming excessively during operational loading. Excessive deformation of the unison ring may cause high stresses to be induced into the VBV system, which over time may lead to premature failure of the VBV system.

The unison ring is connected to two actuator bellcranks and ten door bellcranks. Rotation of the actuator bellcranks by action of a hydraulic actuator causes the ring to rotate, and thus subsequent rotation of the doors. The bellcranks are connected to the doors through clevis and spherical bearing attachments. In the ring to bellcrank connections, ring bushings extend between each bellcrank and the unison ring, and are positioned relative to the bellcranks such that a pre-determined gap is defined between each ring bushing and each bellcrank.

Assembling a known VBV system that includes dedicated ring supports may be a time consuming and tedious process, as the width of the gap between the ring ID and the dedicated supports is facilitated to be minimized. As the gap becomes smaller, assembly of the booster, including the dedicated supports, becomes more difficult as the supports must be inserted inside an inner diameter of the unison ring. However, if the gap is excessively large, the ring will not be adequately supported to minimize system stresses. Additionally in at least some known systems, the width of the bellcrank to bushing gap is predefined to be large enough to facilitate minimizing contact between the ring bushings and each bellcrank during operation. However, widening the gap increases an overall size of the VBV system which increases a cost and weight of the VBV system.

Assembling the VBV system may be time consuming and tedious process, as the width of the gap is optimized. Specifically, in at least some known systems, the width of the gap is predefined to be large enough to facilitate minimizing contact between the ring bushings and each bellcrank during operation. However, widening the gap increases an overall size of the VBV system which increases a cost and weight of the VBV system. On the other hand, although minimizing the width of the gap increases the effectiveness of the dedicated structural supports, the decreased width makes assembly of the VBV much more difficult, and also increases the chances for undesirable contact between the bellcrank and the ring bushings.

BRIEF SUMMARY OF THE INVENTION

In one aspect, a method for assembling a gas turbine engine variable bypass valve system is provided. The method comprises positioning a unison ring circumferentially within the gas turbine engine such that the unison ring is radially outward from a structural frame, coupling at least one bellcrank to the unison ring, such that the unison ring is radially supported only by said at least one bellcrank, and coupling the at least one bellcrank to a bellcrank support that is coupled to the structural frame.

In another aspect of the invention, a variable bypass valve (VBV) system for a gas turbine engine is provided. The VBV system comprises a plurality of bellcranks spaced circumferentially within the gas turbine engine, and an annular unison ring coupled to the plurality of bellcranks for controlling the position of the plurality of bellcranks. The unison ring is radially supported only by the plurality of bellcranks.

In a further aspect, a gas turbine engine is provided. The gas turbine includes a structural frame and a variable bypass valve (VBV) system for selectively controlling air flowing through at least a portion of the engine. The structural frame extends circumferentially within the gas turbine engine. The variable bypass valve (VBV) system includes at least one bellcrank rotatably coupled to the structural frame, and an annular unison ring that is coupled to the bellcrank such that the unison ring is radially supported only by the bellcrank. The unison ring is for selectively controlling actuation of the bellcrank.

DETAILED DESCRIPTION OF THE INVENTION

Figure 1:
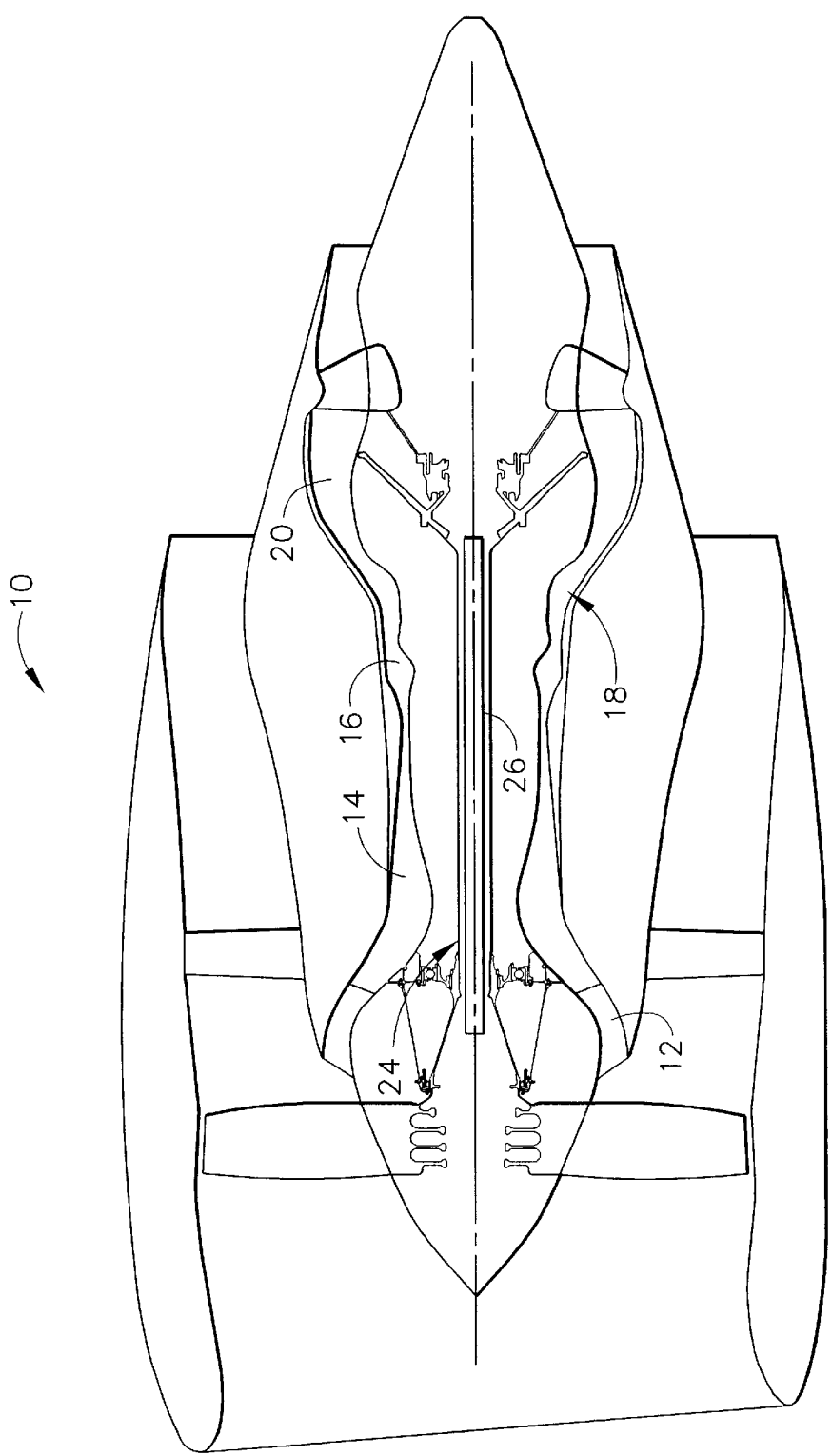
FIG. 1 is a schematic illustration of a gas turbine engine.

FIG. 1 is a schematic illustration of a gas turbine engine 10 including a low-pressure compressor 12, a high-pressure compressor 14, and a combustor 16. Engine 10 also includes a high-pressure turbine 18, and a low-pressure turbine 20. Compressor 12 and turbine 20 are coupled by a first rotor shaft 24, and compressor 14 and turbine 18 are coupled by a second rotor shaft 26. In one embodiment, engine 10 is a GE90 engine available from General Electric Aircraft Engines, Cincinnati, Ohio. In an alternative embodiment, gas turbine engine 10 is a CF6 engine available from General Electric Aircraft Engines, Cincinnati, Ohio.

In operation, air flows through low pressure compressor 12 and compressed air is supplied from low pressure compressor 12 to high pressure compressor 14. Compressed air is then delivered to combustor 16 and airflow from combustor 16 drives turbines 18 and 20.

Figure 2:
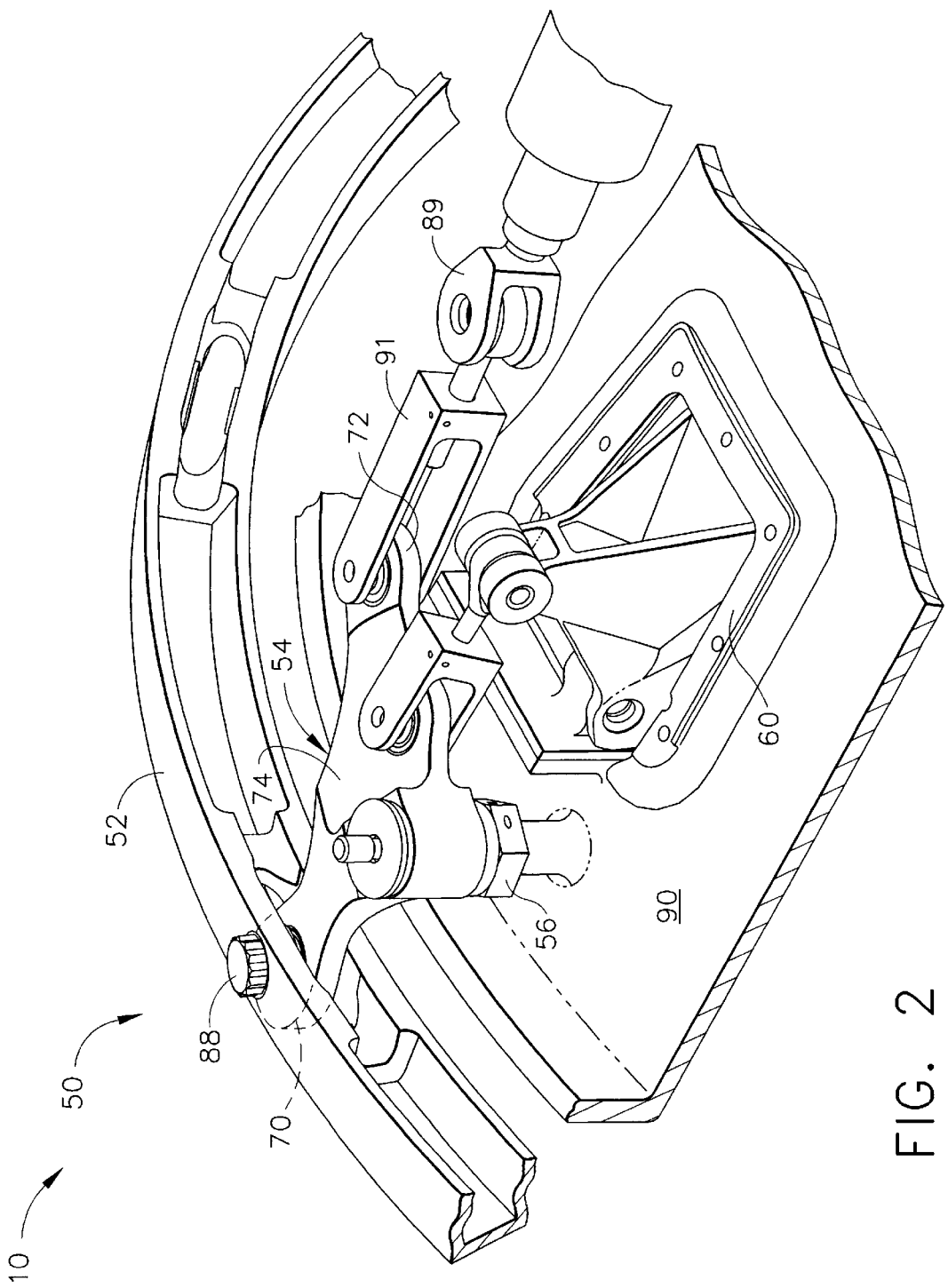
FIG. 2 is a partial view of a variable bypass valve system that may be used with the engine shown in FIG. 1.
Figure 3:
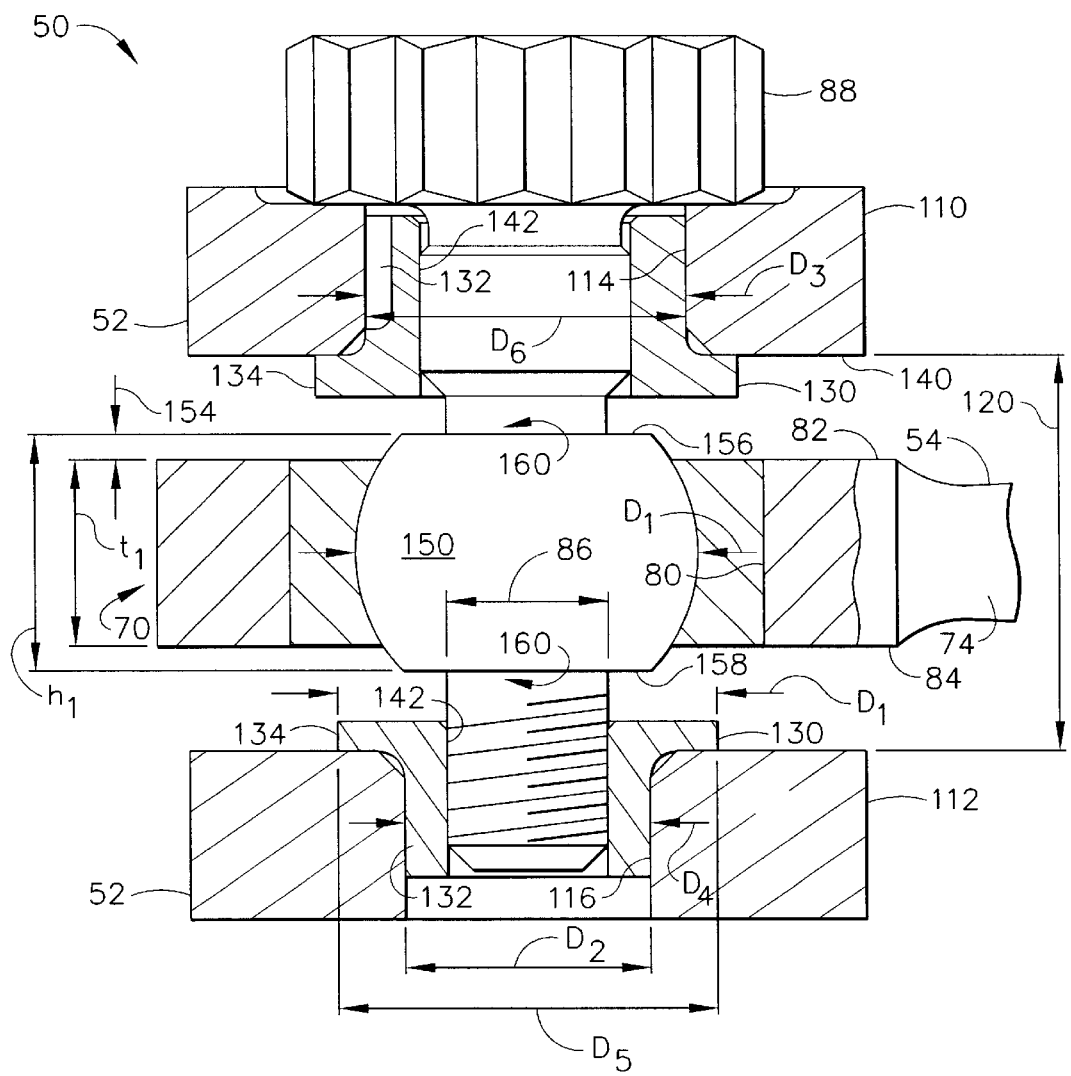
FIG. 3 is an enlarged cross-sectional view of a portion of the variable bypass valve system shown in FIG. 2.

FIG. 2 is a partial view of a variable bypass valve (VBV) system 50 that may be used with engine 10. FIG. 3 is an enlarged cross-sectional view of a portion of variable bypass (VBV) system 50. VBV system 50 includes a unison ring 52, a plurality of bellcranks 54, a plurality of bellcrank supports 56, and a plurality of bypass doors 60. More specifically, in the exemplary embodiment, system 50 includes twelve bellcranks 54 spaced circumferentially within engine 10. Each bellcrank 54 includes an upstream end 70, a downstream end 72, and a body 74 extending therebetween, and having an inherent radial stiffness between ends 70 and 72. Bellcranks 54 are positioned such that body 74 extends substantially parallel to a centerline axis of symmetry (not shown) of engine 10.

Each bellcrank upstream end 70 includes a bearing race 80 extending between a radially outer side 82 and a radially inner side 84 of bellcrank 54. Bearing race 80 contains a bearing element 85 which has an inside diameter 86 that is sized to receive a fastener 88 therethrough. In the exemplary embodiment, fastener 88 is threaded. Each bellcrank downstream end 72 is coupled to each respective bellcrank support 56 which is fixedly coupled to an engine fan frame 90 and is rotatably coupled to at least one actuator 89 by actuator devises 91. Door devises 92 are coupled between bellcrank 54 and each respective bypass door 60, such that actuation of bellcrank 54 causes subsequent rotation of bypass doors 60.

Engine fan frame 90 extends circumferentially within engine 10 around a flow passage 100 extending between low pressure compressor 12 and high pressure compressor 14 (shown in FIG. 1). Bypass doors 60 are selectively operable to regulate the airflow entering high pressure compressor 14 during idle, low power operation, and transient load conditions. More specifically, in a closed position, as shown in FIG. 2, doors 60 are in a sealing contact with fan frame 90 and substantially prevent air from bypassing high pressure compressor 14.

Bellcranks 54 extend upstream from each bellcrank support 56 to couple with unison ring 52. Unison ring 52 is annular and includes a radially outer portion 110 and a radially inner portion 112. In the exemplary embodiment, portions 110 and 112 are substantially identical and are substantially parallel. Each portion 110 and 112 includes a plurality of openings 114 and 116 respectively extending therethrough. Portions 110 and 112 are positioned such that each set of openings 114 and 116 are substantially concentrically aligned. Unison ring portions 110 and 112 are spaced a distance 120 apart which is wider than a thickness $t_1$ of bellcrank upstream end 70.

A plurality of ring bushings 130 are inserted in each portion opening 114 and 116. More specifically, each ring bushing 130 includes a substantially cylindrical portion 132 and an annular lip 134 that extends radially outwardly from portion 132. Accordingly, external diameters $D_1$ and $D_5$ of lip 134 are larger than external diameter $D_2$ and $D_6$ of cylindrical portion 132. Furthermore, lip external diameter $D_1$ and $D_5$ are larger than respective diameters $D_3$ and $D_4$ of each unison ring opening 114 and 116, and cylindrical portion diameters $D_2$ and $D_6$ are slightly larger than unison ring openings $D_3$ and $D_4$. Accordingly, each ring bushing cylindrical portion 132 is at least partially received within each unison ring opening 114 and 116 such that each bushing annular lip 134 contacts an external surface 140 of each unison ring portion 110 and 112. Each ring bushing 130 also includes an opening 142 extending therethrough and sized to receive fastener 88 therethrough.

Bellcrank bearing 150 is inserted within each bellcrank upstream end bearing race 80. In the exemplary embodiment, bearing 150 is a spherical bearing and has a high axial load capability. Spherical bearing 150 has a height $h_1$ that is taller than bellcrank upstream end thickness $t_1$ and accordingly, bearing 150 extends a distance 154 outwardly from each bellcrank side 82 and 84 to a respective bearing radially outer contact surface 156 and a bearing radially inner contact surface 158.

A gap 160 is defined between each ring bushing 130 and each respective bearing contact surface 156 and 158. Gaps 160 facilitate accommodating component tolerance stack-ups during assembly and permit a nominal amount of radial movement of bellcrank bearing 150.

During engine operation, VBV system 50 is actuated to permit airflow to exit and bypass high pressure compressor 14. Specifically, selective operation of bypass doors 60 facilitates preventing aerodynamic stalls within engine 10. More specifically, as unison ring 52 is actuated, bellcrank 54 is rotated to cause rotation of bypass doors 60 from an open position to a closed position, or vice-versa depending on the actuation direction of unison ring 52. Furthermore, as ring 52 is actuated, bellcrank spherical bearing radially outer contact surface 156 or bearing radially inner contact surface 158 contacts a respective ring bushing 130 to facilitate providing radial support for unison ring 52 without additional dedicated structural supports. More specifically, depending on loading induced to VBV system 50, spherical bellcrank bearing 150, gap 160 may be minimized to enable bearing 150 to "bottom out" against a ring bushing 130 and provide additional radial support for unison ring 52.

As a result, a load path 170 through VBV system is changed from being transmitted directly into a booster flange, as is known in the art, to being transmitted into fan frame 90 through bellcranks 54 and bellcrank supports 56. Furthermore, because ring 52 is radially supported by twelve bellcranks 54 which extend downstream from a perimeter of unison ring 52, loading transmitted to ring 52 is facilitated to be more evenly distributed through VBV system 50 as compared to other known VBV systems, and thus, less stresses are induced through system 50.

During assembly of VBV system 50, because dedicated supports are non-existent to interfere with unison ring 52, assembly time of engine 10 is facilitated to be reduced and less labor intensive as components installed within engine 10 after unison ring 52 is installed do not require navigation around the dedicated supports. Furthermore, because the dedicated supports are not required, VBV system 50 facilitates reducing assembly costs and an overall engine weight.

The above-described variable bypass valve system for a gas turbine engine is cost-effective and reliable. The variable bypass valve system includes a unison ring that is such that the unison ring is radially supported only by the bellcranks. Accordingly, the variable bypass valve system does not include any dedicated unison ring supports, and as such, assembly costs and an overall weight of the engine are reduced. Furthermore, because the variable bypass valve system includes twelve bellcranks, the system is radially supported by the bellcranks such that loading transmitted from the unison ring during actuation is facilitated to be evenly distributed through the unison ring. As a result, the variable bypass valve system facilitates extending a useful life of the engine in a cost effective and reliable manner.

Exemplary embodiments of variable bypass valve systems are described above in detail. The systems are not limited to the specific embodiments described herein, but rather, components of each assembly may be utilized independently and separately from other components described herein. Each variable bypass valve component can also be used in combination with other variable bypass valve components While the invention has been described in terms of various specific embodiments, those skilled in the art will recognize that the invention can be practiced with modification within the spirit and scope of the claims.

What is claimed is:

1. A method for assembling a gas turbine engine variable bypass valve system, said method comprising:
    positioning a unison ring to extend circumferentially within the gas turbine engine such that the unison ring is radially outward from a structural frame;
    coupling at least one bellcrank to the unison ring, such that the unison ring is radially supported only by said at least one bellcrank; and
    coupling the at least one bellcrank to a bellcrank support that is coupled to the structural frame.

2. A method in accordance with claim 1 wherein coupling at least one bellcrank to the unison ring further comprises:
    coupling a spherical bushing to an end of the at least one bellcrank; and
    coupling the unison ring to the at least one bellcrank through the spherical bushing.

3. A method in accordance with claim 1 wherein coupling at least one bellcrank to the unison ring further comprises coupling at least one bushing to the unison ring such that the bushing extends between the unison ring and the at least one bellcrank.

4. A method in accordance with claim 1 wherein coupling at least one bellcrank to the unison ring further comprises coupling the unison ring to the bellcrank with a threaded fastener that extends through an opening in the unison ring and through an opening in the at least one bellcrank.

5. A method in accordance with claim 1 wherein coupling at least one bellcrank to the unison ring further comprises coupling at least twelve bellcranks to the unison ring such that the bellcranks are spaced circumferentially around the structural frame.

6. A variable bypass valve (VBV) system for a gas turbine engine, said VBV system comprising:
    a plurality of bellcranks spaced circumferentially within the gas turbine engine; and
    an annular unison ring coupled to said plurality of bellcranks for controlling actuation of said plurality of bellcranks, said unison ring radially supported only by said plurality of bellcranks.

7. A VBV system in accordance with claim 6 wherein each said bellcrank comprises an upstream end and a downstream end, said unison ring coupled to each said bellcrank upstream end for actuating said plurality of bellcranks.

8. A VBV system in accordance with claim 7 wherein each said unison ring coupled to each said bellcrank upstream end by a threaded fastener.

9. A VBV system in accordance with claim 7 wherein each said bellcrank upstream end comprises a bearing race extending therethrough, said VBV system further comprising a spherical bearing inserted within each said bellcrank upstream end bearing race.

10. A VBV system in accordance with claim 6 further comprising at least one bushing extending between said bellcrank and said unison ring.

11. A VBV system in accordance with claim 10 wherein said bellcrank configured to contact said at least one bushing during operation.

12. A VBV system in accordance with claim 6 wherein said plurality of bellcranks comprise twelve bellcranks spaced circumferentially within the gas turbine engine.

13. A VBV system in accordance with claim 6 wherein said unison ring configured to transmit an induced load path through said plurality of bellcranks.

14. A gas turbine engine comprising:
    a structural frame extending circumferentially within said gas turbine engine; and
    a variable bypass valve (VBV) system for selectively controlling air flowing through at least a portion of said gas turbine engine, said VBV system comprising at least one bellcrank rotatably coupled to said structural frame, and an annular unison ring coupled to said at least one bellcrank such that said unison ring is radially supported only by said at least one bellcrank, said unison ring for selectively controlling actuation of said at least one bellcrank.

15. A gas turbine engine in accordance with claim 14 wherein said VBV system unison ring configured to transmit an induced load path to said structural frame through said at least one bellcrank.

16. A gas turbine engine in accordance with claim 15 wherein said VBV system unison ring coupled to an end of said at least one bellcrank by a threaded fastener.

17. A gas turbine engine in accordance with claim 15 wherein said VBV system further comprises a spherical bearing, said unison ring coupled to an end of said at least one bellcrank through said spherical bearing.

18. A gas turbine engine in accordance with claim 15 wherein said VBV system further comprises at least one bushing extending between said unison ring and said at least one bellcrank.

19. A gas turbine engine in accordance with claim 18 wherein said VBV system at least one bellcrank configured to contact said at least one bushing during operation.

20. A gas turbine engine in accordance with claim 15 wherein said at least one bellcrank further comprises at least twelve bellcranks spaced circumferentially around said structural frame.

* * * * *